INVENTOR:
Hans Meier
BY
Darby, Robertson & Vandenburgh,
Attys.

United States Patent Office 3,490,693
Patented Jan. 20, 1970

3,490,693
GASEOUS FUEL CONTROL FOR CIRCULATING HEATING SYSTEMS
Hans Meier, Remscheid, Germany, assignor to Joh. Vaillant KG.
Filed Dec. 1, 1967, Ser. No. 687,267
Claims priority, application Germany, Jan. 4, 1967, V 32,705
Int. Cl. F24d 3/00; F22b 35/00; F28f 27/00
U.S. Cl. 237—8                             4 Claims

ABSTRACT OF THE DISCLOSURE

The provision of a water switch in a gas fired hot water heating system comprising a heating circuit having feed and return lines, a by-pass line connected between the feed and return lines for by-passing the heating circuit, a changeover valve operable to control the supply to the by-pass line.

The invention relates to apparatus for controlling the supply of gas to gas-heated instant water heaters which serve as heat source for a hot water circulation heating system.

It has already been proposed in circulation heating systems to provide a connecting line controlled by a changeover valve between the feed and return line for short-circuiting the heating circuit. The purpose of such a by-pass for the heating circuit containing the room radiators is to obtain in the heat exchanger of the instant water heater high temperatures as rapidly as possible during the heating up period, that is to say, when the circulating water is still cold, in order to avoid the formation of condensate on the heat exchanger. By-passing the heat circuit therefore dispenses with heat dissipation in the radiators during the heating up period and the heating feed water is immediately fed into the return line until a sufficiently high water temperature is obtained in the shorter circuit. The purpose of by-passing the heating circuit may also be to permit rapid heating of tap water during heating operation if an additional heat exchanger for tap water is incorporated in the manner already proposed into the by-pass line which by-passes the heating circuit. The water circulating in the shorter circuit then serves exclusively for heating the tap water heat exchanger, while the supply of heat to the radiators is temporarily dispensed with when tap water is drawn.

For obvious reasons it is known in hot water circulation heating systems to operate the instantaneous gas heated water heater serving as heat source at less than its full output, which is reduced by throttling the gas supply. Such a throttled output of the instantaneous water heater for the heating circuit is, however, a disadvantage in heating tap water and it is already known for the instantaneous water heater, operating under throttled conditions, to be automatically and temporarily changed over to full output relative to the rate at which tap water is drawn.

Operating the instantaneous water heater during the heating up period at reduced output is also extremely disadvantageous because only a reduced amount of exhaust gas is available for heating up the exhaust gas flue which will still be cold. Moreover, the critical heating up period for the heat exchanger of the instantaneous water heater is prolonged by the throttled output.

The object of the invention is to provide apparatus for controlling the supply of gas of such circulation heating systems where such apparatus automatically adjusts for full output during the heating up period and, where appropriate, when tap water is drawn, while a throttled output is automatically adjusted in plain heating operation. According to the invention, this is achieved by providing a water switch responding to the flow pressure in the by-passable part of the heating circuit, said water switch throttling the supply of gas when the by-pass line is closed or throttled. Changeover of the instantaneous water heater to reduced output according to the invention is therefore made dependent on the rate at which water flows through the heating circuit containing the radiators. The water flow rate is measured in usual manner by forming a dynamic pressure differential, which may be detected by a venturi nozzle or from a throttle diaphragm edge or which results from the flow resistance of the radiators between the feed and return line.

It is possible to arrange that the changeover valve controlling the by-pass line closes the said by-pass line relative to the feed temperature when a certain predetermined heating up temperature is exceeded. This arrangement automatically terminates the heating up period.

To perform the invention it is possible to arrange that the shank of the gas valve is provided with a thickened portion, preferably in the form of a cone, and is moved by the water switch in the direction in which the valve closes, until the thickened portion bears upon a preferably radially adjustable stop in an intermediate throttling position of the valve. Alternatively, it is also possible to provide an adjustable throttle diaphragm upstream of the gas valve, which is maintained in the open position by a lack of water safety device, said throttling diaphragm being operated by the water switch of the heating circuit via a linkage.

Embodiments of the invention will now be described by way of example with reference to the accompanying diagrammatic drawings in which.

Figure 1:
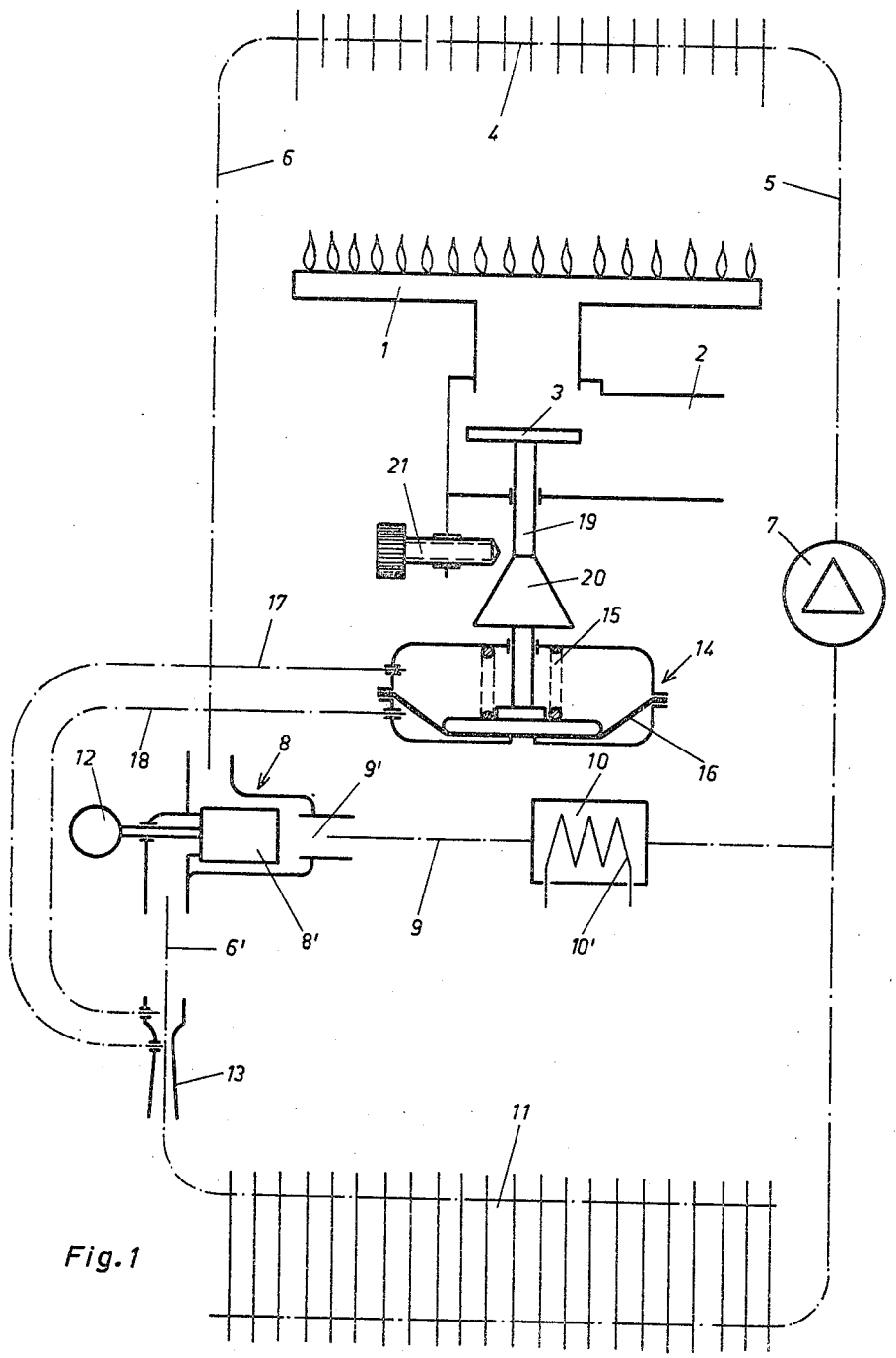
FIGURE 1 shows the apparatus according to one embodiment of the invention.

Referring to FIGURE 1 the apparatus has a gas burner 1 which is supplied from a pipeline 2 via a gas valve 3. The gas burner 1 is disposed in usual manner below a heating shaft not shown, but terminated at the top by a finned block 4 functioning as a heat exchanger. The finned block 4 has connected to it on the inlet side a return line 5 and on the outlet side a feed line 6 of a circulation heating system. A circulating pump 7 is incorporated in the return line. The feed line 6 extends to a changeover valve 8 which is connected to a by-pass line 9. Said by-pass line 9 connects the feed line 6 directly to the return line 5 and it contains a heat exchanger 10 for tap water which flows through a pipe coil 10' embedded in the heat exchanger. A branch 6' of the feed line 6 extends from the changeover valve 8 to the room radiators indicated at 11, to which the return line 5 is connected. In the position of the changeover valve 8 shown in FIGURE 1, the feed line 6 is connected to the by-pass line 9, so that the circulating pump 7 produces water circulation in a shortened circuit incorporating the finned block 4, the feed line 6, the changeover valve 8 to the room radiators indicated at 11, to which incorporating the radiators 11 and the branch 6' of the feed line is by-passed. The changeover valve 8 contains a valve closing element 8', which may be moved axially by a servomotor 12 and is also constructed as thermostatic expansion body. Such a changeover valve 8 is disclosed in German Patent application V 29,774 (corresponding U.S. Patent 3,426,971). The changeover valve 8 will remain in the position shown for as long as tap water is drawn from the pipe coil 10'. As soon as the withdrawal of tap water ceases, the valve closing element 8' is displaced to the right by the servomotor 12, but closes the port 9' of the by-pass line 9 only atfer the temperature of the feed water in the feed line 6 has exceeded a certain value. During the heating up period, the changeover valve 8 therefore occupies a position in which communication is established between the feed line 6 and the branch 6', as well as to the by-pass line 9. If the feed water is cold and as a result of the reduced flow resistance, a large amount of water will therefore flow via the by-pass line 9 and only a small amount of water will flow via the branch 6' to radiators 11. As the temperature of the feed water is increased, the proportion of water flowing through the branch 6' is accordingly increased and the proportion of water flowing via the by-pass line 9 is accordingly decreased, until the by-pass line 9 is completely closed and the entire quantity of water flows via 6' into the heating circuit.

A venturi nozzle 13, from which a dynamic pressure differential, depending on flow, is tapped off and ducted to a water switch 14, is incorporated into the branch 6'. The water switch 14 contains a diaphragm 16 which is biased by a spring 15. The vacuum produced on the venturi nozzle 13 is supplied via a delivery line 17 above the diaphragm and the back pressure resulting upstream of the venturi nozzle 13 is supplied via a delivery line 18 below the diaphragm 16. The shank 19 of the gas valve 3 bears upon the diaphragm 16. Said shank 19 is provided with a cone-shaped thickened portion 20. A stop for the cone 20 is formed by an adjustable screw 21 which is disposed radially in relation to the shank 19 of the gas valve. If a sufficiently large quantity of water flows through the branch 6' and through the venturi nozzle 13, so that the by-pass effect of the heating circuit (6', 11, 5) is practically eliminated, the resultant flow pressure of the heating water causes the diaphragm 16 to be raised and for the gas valve 3 to be moved into an intermediate position determined by the stop 20/21 and throttling the supply of gas. This ensures that the burner 1 is operated at reduced output only if the flow through the branch 6', that is to say, through the heating circuit, is sufficiently large.

Figures 2, 2A:
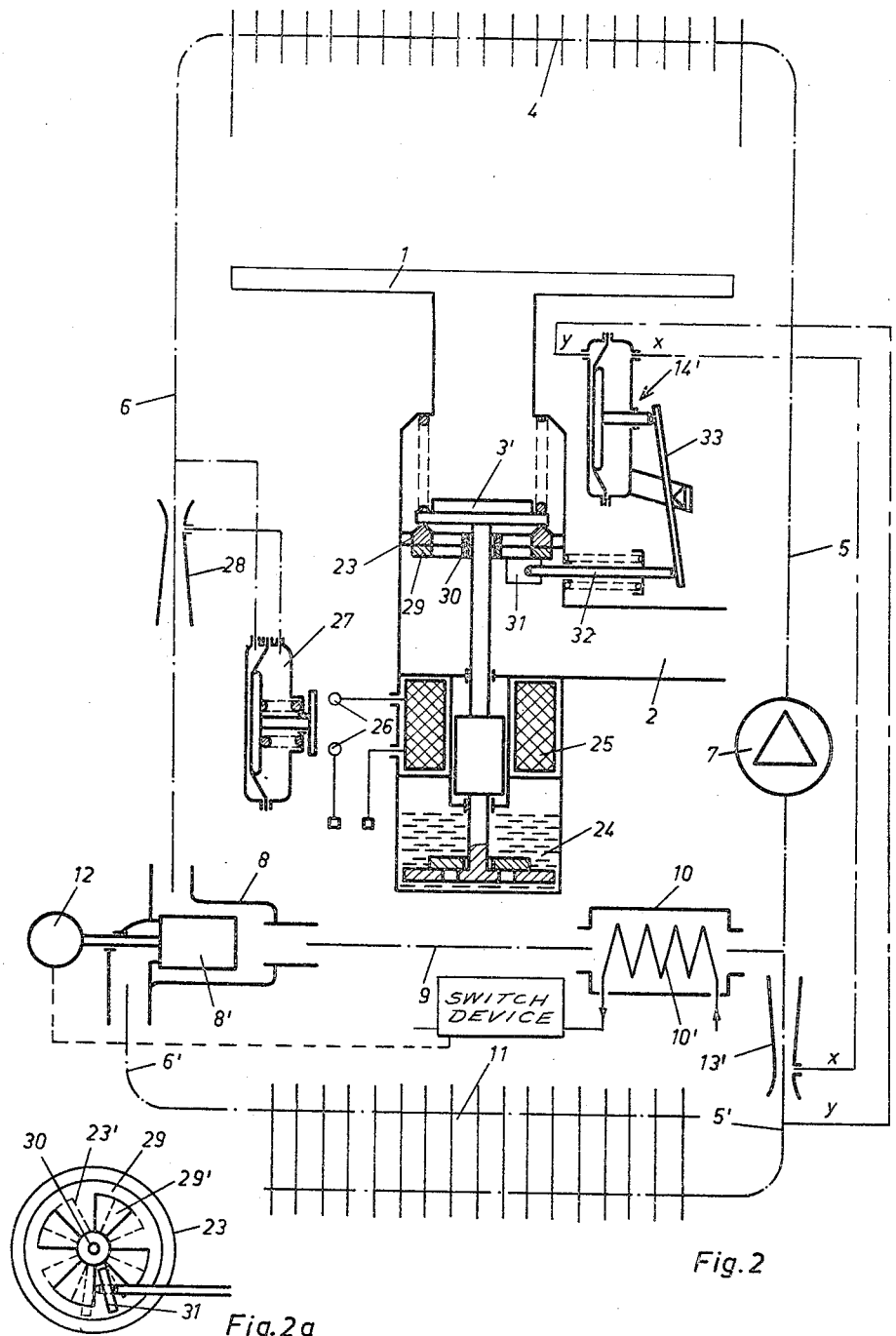
FIGURE 2 shows the apparatus according to a second embodiment of the invention.
FIGURE 2a shows a detail of the apparatus of FIGURE 2.

In the embodiment shown in FIGURE 2, the gas valve 3', biased by a spring 22, bears on a valve seat ring 23. The gas valve 3' may be lifted off the valve seat ring 23 by an electromagnet 25 which is provided with a slow ignition device 24. The electromagnet 25 is energized via contacts 26, which are closed by a diaphragm water switch 27. The diaphragm water switch 27 is connected to a venturi nozzle 28, which is incorporated into the feed line 6. For as long as circulating pump 7 is in operation, the venturi nozzle 28 will have a flow pressure applied to it to cause the water switch 27 to respond and to the magnet 25 to be energised. The aforementioned system which therefore functions as a safety device against lack of water, causes the gas valve 3' to be kept open while the circulating pump 7 is in operation. A diaphragm 29 which throttles the flow of gas is disposed upstream of the gas valve 3'. The aforementioned diaphragm 29 is rotatably disposed below the valve seat ring 23, on a collar 30 thereof and is maintained in the open position by a spring which is not shown. The diaphragm 29 has four sectors 29' which more or less shroud corresponding sector-shaped apertures 23' of the valve seat ring 23 (see FIG. 2a). A downwardly extending radial vane 31 is mounted on the rotatable diaphragm, a pin 32 bearing upon said vane. The pin 32 is operated by a lever in the sense of rotating the throttle diaphragm 29, said lever bearing upon a water switch 14'. As indicated by the letters x, y, the water switch 14' is connected to a venturi nozzle 13' which is incorporated in a heating circuit branch 5' of the return line 5. Flow pressure acting on the venturi nozzle 28 therefore causes the gas valve 3' to be fully open. As soon as flow pressure is produced in the heating circuit on the venturi nozzle 13' during heating operation, the throttle diaphragm 29 is rotated and the supply of gas is throttled to reduce output.

I claim:
1. In a gas flow control apparatus for controlling the supply of gas to a gas-heated instantaneous water heater which is adapted to serve as heat source for a forced circulation hot water heating system including a water pump and a radiator circuit including a radiator which system also includes by-pass means for by-passing said radiator circuit, said by-pass means being controlled by a change-over valve the improvement in which the apparatus includes a gas valve operated by a water switch which responds to water flow pressure differential in the radiator circuit and which throttles the supply of gas when the by-pass means is closed or throttled.

2. Control apparatus according to claim 1 wherein the gas valve has a shank which is provided with a thickened portion in the form of a cone, and is operated by the water switch in the closing direction of the valve until the thickened portion bears upon a radially adjustable stop when the valve is in a throttling intermediate position.

3. In a gas fired hot water heating system comprising a gas heated instantaneous water heater, a radiator circuit having feed and return lines, a by-pass line connected between the feed and return lines for by-passing a by-passable part of the radiator circuit, change-over valve means operable to control the supply to the by-pass line, said change-over valve means being constructed to close the by-pass means when water in the feed line exceeds a pre-determined temperature, and gas valve means for providing maximum gas flow to said heater during maximum water flow through said by-pass line, the improvement including: a water switch for regulating the supply of gas to said heater when the by-pass line is closed or throttled said water switch means being responsive to water flow pressure differential in the by-passable part of the radiator circuit.

4. In a gas flow control apparatus for controlling the supply of gas to a gas-heated instantaneous water heater which is adapted to serve as heat source for a forced circulation hot water heating system including a water pump and a radiator circuit including a radiator which system also includes by-pass means for by-passing said radiator circuit, said by-pass means being controlled by a change-over valve, the improvement in which the apparatus includes gas valve means operated by a water switch which responds to water flow pressure differential in the radiator circuit and which throttles the supply of gas when the by-pass means is closed or throttled, said gas valve means including a first gas valve comprising an adjustable gas throttle disposed in series with a second gas valve, the second valve being maintainable in the open position by a second water switch which responds to water flow pressure differential, said second water switch opening said second gas valve in response to water flow between said heater and said change-over valve.

References Cited

UNITED STATES PATENTS

| 3,426,971 | 2/1969 | Meier | 237—8 |
| 1,602,352 | 10/1926 | Foley | 236—32 |
| 2,008,400 | 7/1935 | Mott | 236—32 |
| 2,322,872 | 6/1943 | Moore | 237—8 |

FOREIGN PATENTS

| 1,364,436 | 5/1964 | France. |

EDWARD J. MICHAEL, Primary Examiner

U.S. Cl. X.R.

236—25

UNITED STATES PATENT OFFICE
CERTIFICATE OF CORRECTION

Patent No. 3,490,693　　　　　　　　Dated January 20, 1970

Inventor(s) Hans Meier - Assignee - Joh Vaillant KG

It is certified that error appears in the above-identified patent and that said Letters Patent are hereby corrected as shown below:

Column 2, Line 63, "to the room radiation indicated at 11, to which" should read --and the by-pass line 9. The heating circuit--.

Column 3, Line 66, after "diaphragm", insert --29--.

SIGNED AND SEALED
AUG 25 1970

(SEAL)
Attest:

Edward M. Fletcher, Jr.
Attesting Officer

WILLIAM E. SCHUYLER, JR.
Commissioner of Patents